United States Patent

[11] 3,594,737

[72] Inventors Marc Haure-Touze
Montrouge;
Abdelkader Khimeche, Saint-Michel-sur-Orge, both of, France

[21] Appl. No. 789,055
[22] Filed Dec. 31, 1968
[45] Patented July 20, 1971
[73] Assignee Compagnie Generale D'Electricite
Paris, France
[32] Priority Jan. 5, 1968
[33] France
[31] 135,098

[54] TUNNEL DIODE MEMORY-POINTS MATRIX FOR READING-WRITING, DEVICE AND METHOD OF PRODUCING
3 Claims, 9 Drawing Figs.

[52] U.S. Cl. .... 340/173 R, 307/317, 307/322, 340/173 NR
[51] Int. Cl. .... G11c 11/38, G11c 5/02
[50] Field of Search .... 340/173, 166, 173 NR; 307/317, 322

[56] References Cited
UNITED STATES PATENTS

| | | | |
|---|---|---|---|
| 3,107,345 | 10/1963 | Gruodis | 340/173 |
| 3,119,985 | 1/1964 | Kaufman | 340/173 |
| 3,221,180 | 11/1965 | Kaufman | 340/173 X |
| 3,484,932 | 12/1969 | Cook | 340/173 X |

*Primary Examiner*—Terrell W. Fears
*Assistant Examiner*—Stuart Hecker
*Attorney*—Sughrue, Rothwell, Mion, Zinn & MacPeak

ABSTRACT: "Memory elements" matrix for reading-recording device designed in the form of an integrated circuit and enabling nondestructive reading of the data which is recorded there. Each "memory element" comprising a tunnel diode, a unitunnel diode and a normal diode, these three diodes having cathodes composed of the same silicon substrate in which junctions are formed and in which the load resistor of the tunnel diode may also be formed.

TUNNEL DIODE MEMORY-POINTS MATRIX FOR READING-WRITING, DEVICE AND METHOD OF PRODUCING

The present invention relates to a "memory-points" matrix for a reading-writing device, utilizing for each "memory point" a tunnel diode, and permitting nondestructive readout of the information written therein by the use of another tunnel diode.

Tunnel-diode memories are known, wherein the readout is effected with the aid of transistors, the effect of which is to produce, at a tunnel diode carrying an item of information, a changeover which indicates the existence of this information, but which produces at the same time the erasure of the latter. It is therefore necessary to employ a transition register in which the information is stored and from which it can be extracted and thereafter reinjected into a memory after readout.

Tunnel-diode memories are also known in which the reading does not produce any erasure of the information previously written in. In these memories, the variation of the current flowing through a memory tunnel diode during the readout of the state of this diode, may be limited by an auxiliary tunnel diode which then performs the function of a threshold.

The invention relates to a reading-writing device which utilizes the low voltage current threshold property of a tunnel diode for passing into a matrix, formed of tunnel-diode "-memory points," either interrogation currents, which allows a stored item of information to remain therein, or writing currents.

It is known that, in a matrix assembly comprising lines (or rows) and columns the "memory points" disposed at the intersections of the rows and of the columns may be grouped either to form a series matrix or to form a parallel matrix. In a series matrix, the column corresponds to a binary character of a particular order, and the row corresponds to a word composed of binary characters of various orders. In a parallel matrix, on the other hand, a line or row corresponds to a binary character of a particular order in the words, and a column corresponds to a word composed of binary characters of various orders.

In accordance with the invention, the "memory point" of a matrix comprises a tunnel diode, a unitunnel diode and a normal diode, these three diodes having their cathodes connected to a common point to which there is also connected a load resistor, which is also called a bias resistor.

In accordance with the invention, a tunnel-diode memory device, which may be employed in series or in parallel, comprises in each column an auxiliary tunnel diode, the value of the peak current of which auxiliary tunnel diode fixes the maximum value of the reading current flowing through the main tunnel diode of the memory point in response to an interrogating pulse, the reading current thus remaining below the value of the current which, when added to the rest current, would cause the said main tunnel diode to change over. In addition, when the assembly formed of the aforesaid auxiliary tunnel and unitunnel diodes simultaneously receives the writing and reading signals, it allows the passage of a current of sufficiently high value to change over the main tunnel diode.

The "memory point" according to the invention may be constructed in integrated form.

The invention will be more readily understood from the more detailed description thereof which will now be given by way of example with reference to the accompanying figures.

Figure 1:
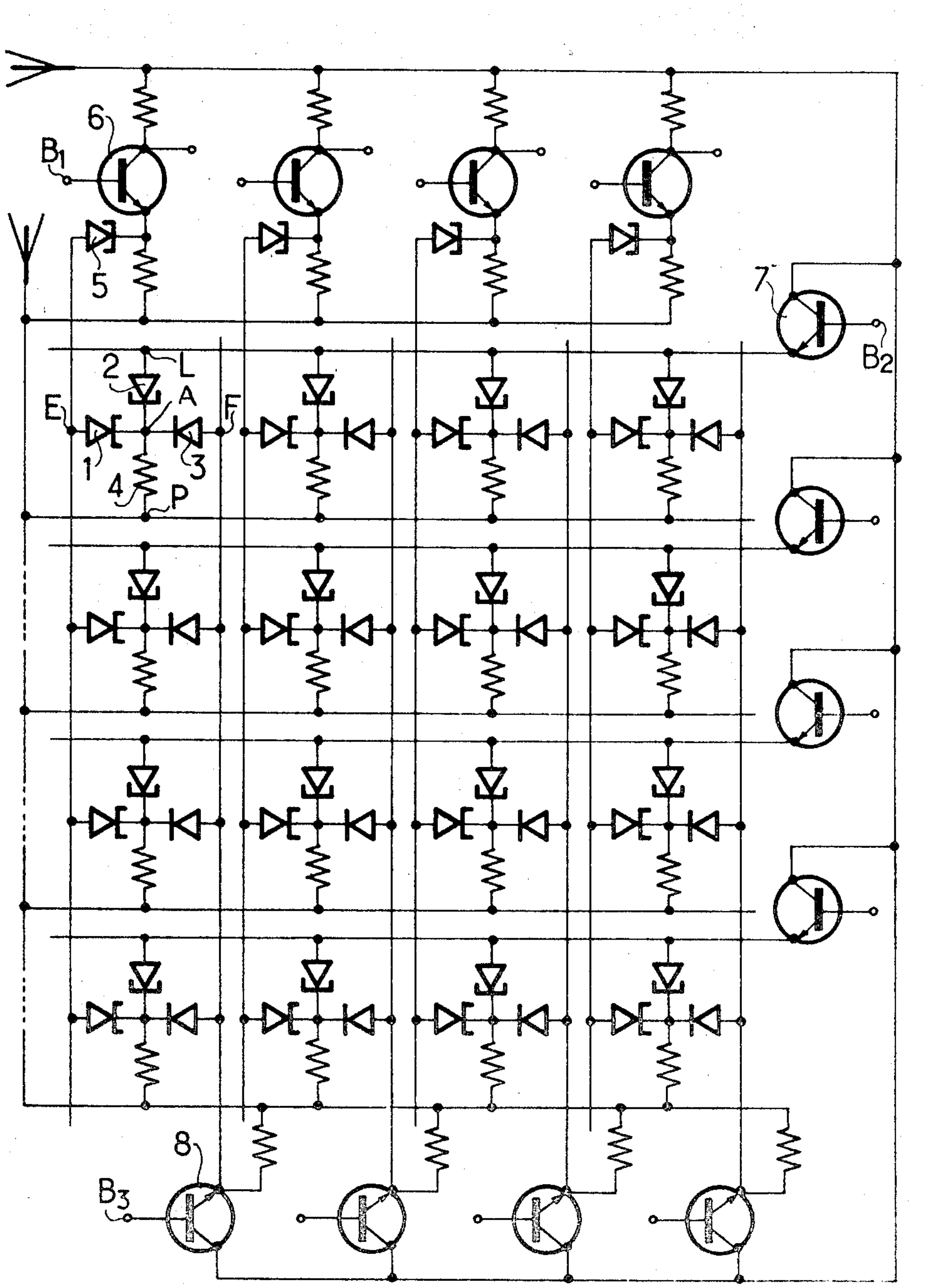
FIG. 1 shows the complete diagram of a parallel matrix comprising "memory points" according to the invention, which is adapted to store *q* words of *p* characters.
Figure 3A:
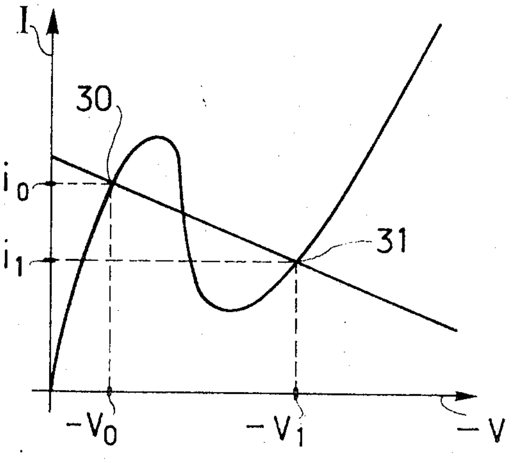
Figures 3B, 3C:
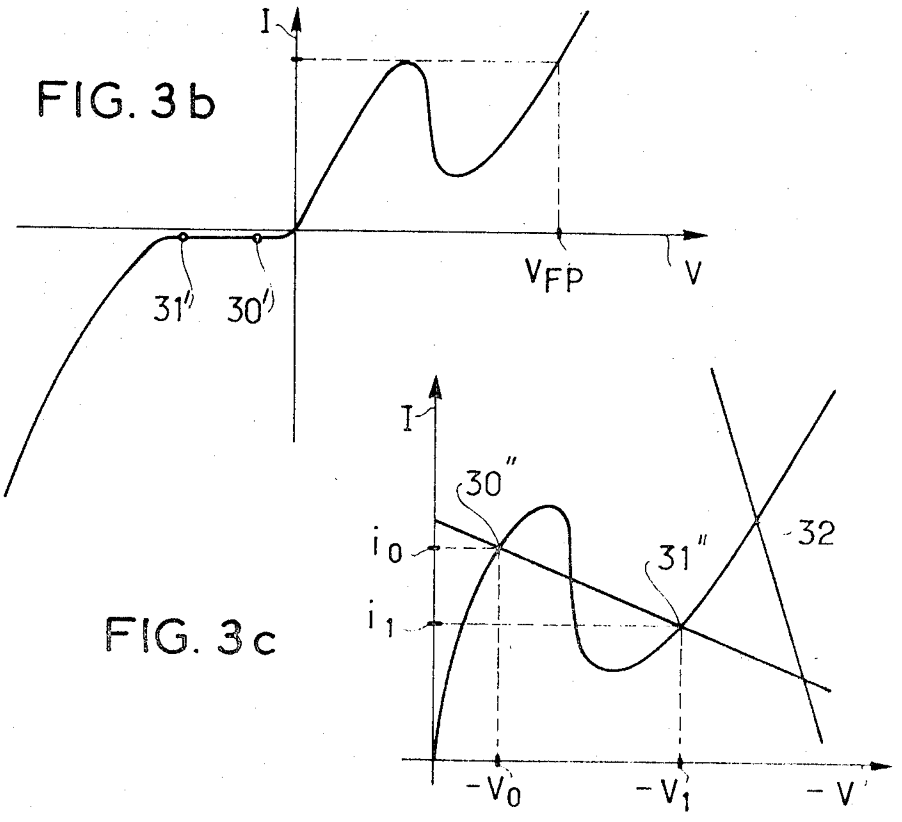

FIGS. 3*a* and 3*b* illustrate respectively the current-voltage characteristics of the diode 2 and of the set of diodes 1 and 5 of the "memory point" according to FIG. 1, and FIG. 3*c* illustrates the figurative points of the operation of the diode 2 for two different states of the said diode.

Figure 4:
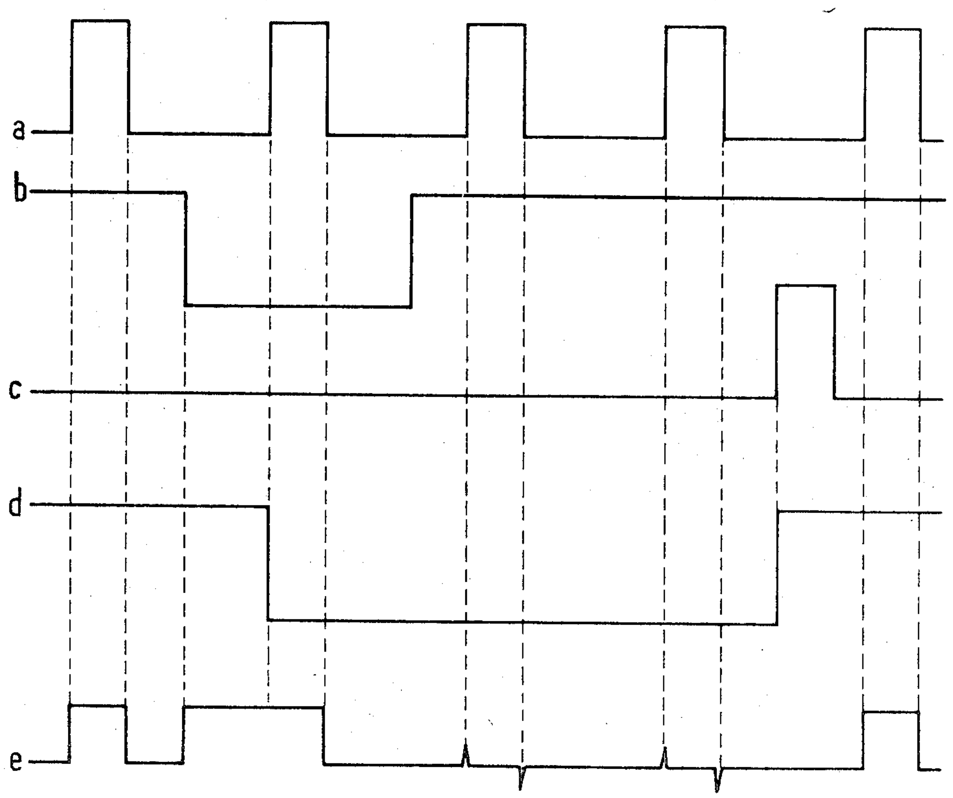

FIG. 4 is a diagram schematically representing, as a function of time, the reading, writing and erasure pulses applied to the matrix in various stages of its operation.

Figure 5A:
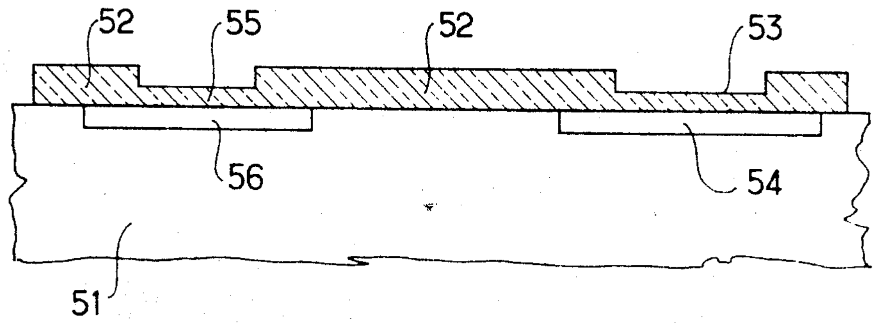
Figure 5B:
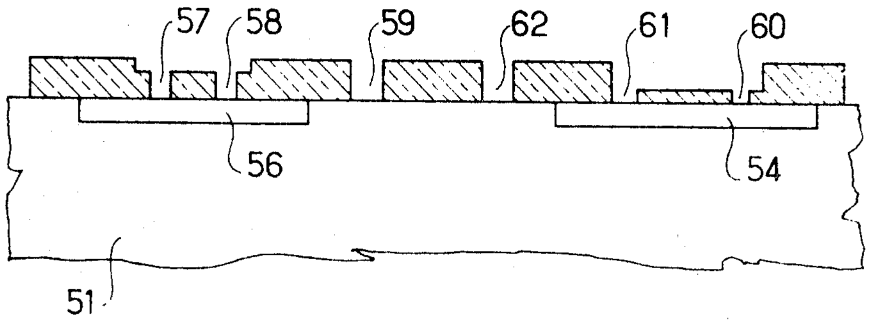
Figure 5C:
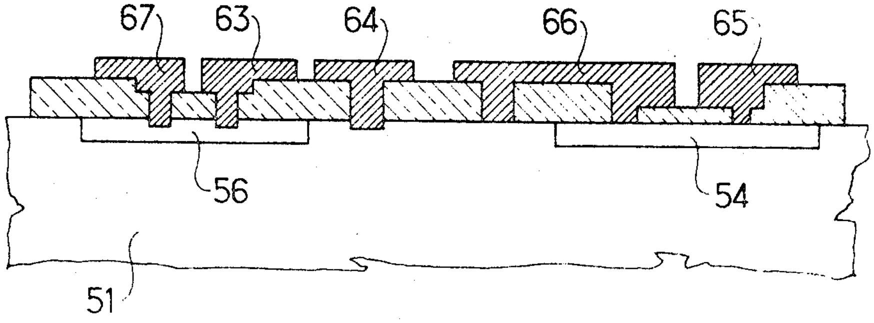

FIGS. 5*a*, 5*b* and 5*c* schematically illustrate the main stages in the production of a memory point according to the invention in integrated form.

In the matrix according to FIG. 1, a "memory point" consists of an assembly comprising a unitunnel diode 1, a tunnel diode 2 and a normal diode 3, the cathodes of which are connected at a common point A, to which a bias resistor 4 is also connected. The anode of the unitunnel diode 1 is connected at E to the anode of an auxiliary diode 5 whose cathode is connected to the emitter of a transistor 6 having its base connected to a terminal $B_1$ called the "writing terminal." The anode of the tunnel diode 2 is connected at L to the emitter of a transistor having its base connected to a terminal $B_2$, called the "reading terminal." The anode of the normal diode 3 is connected at F to the emitter of a transistor 8 having its base connected to a terminal $B_3$, called the "erasure terminal." Finally, the free end of the resistor 4 is connected at P to a bias source (not shown), which supplies for example, a voltage of −5 volts. The transistor 7 controls, in rows, the reading of all the binary characters of like order in the words. The transistor 8 controls, in columns, the erasure of all the characters of a word. The write-in is effected when there is coincidence between a reading pulse applied by the terminal $B_2$ to the transistor 7 and a writing pulse applied by the terminal $B_1$ to the transistor 6.

The memory matrix comprises as many transistors such as 6 and writing terminals such as $B_1$ as there are columns, as many transistors such as 7 and reading terminals such as $B_2$ as there are rows, and as many transistors such as 8 and erasure terminals such as $B_3$ as there are columns.

Figure 2:
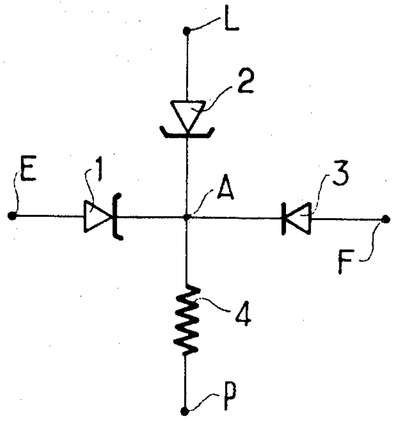
FIG. 2 is the electric circuit diagram of a "memory point" of the said matrix.

FIG. 2 is a diagrammatic view, drawn to a larger scale, of the elements of a "memory point" of the matrix according to FIG. 1.

FIGS. 3*a*, 3*b* and 3*c* illustrate the current-voltage characteristics of the diodes constituting a "memory point" of the matrix according to the invention.

The diagram 3*a* conventionally represents the characteristic of the tunnel diode 2, as also the load line corresponding to the feeding of this diode in series with the resistor 4 at normal voltage.

The diagram 3*b* is the characteristic curve of the assembly comprising the unitunnel diode 1 and the auxiliary diode 5 in series, the positive current values corresponding to the passage of the current through the diode 5 in the forward direction. On the right-hand portion of this diagram corresponding to a bias of the diode 1 in the inverse direction, the influence of this diode 1 may be regarded as negligible, because it is known that a unitunnel diode biased in the inverse direction only introduces a small potential drop. The form of this part of the diagram is therefore similar to that which would correspond to the diode 5 alone. Reciprocally, on the left-hand portion of the diagram, corresponding to an inverse bias of the diode 5, the influence of the latter may in turn be regarded as negligible, because it is known that a tunnel diode biased in the inverse direction introduces only a small potential drop. This is why this portion of the diagram comprises a substantially horizontal level portion which is similar to that of the characteristic curve of the forwardly biased unitunnel diode 1. It is on this level portion that the points corresponding to the two stable states of the memory point are located.

The diagram 3*c* symbolically shows the state of the diode 2 when it is at "rest" and when it is biased for writing.

FIG. 4 is a diagram illustrating respectively, as a function of time, the following pulses: at "*a*," the "reading-control" pulses, at "*b*" the writing pulses, at "*c*" the erasure pulses, at "*d*" the "states" of the tunnel diode of the memory point, and at "*e*" the "reading-output" pulses.

The operation of the apparatus according to the invention will now be explained with reference to these figures.

It will first of all be explained how the state of the tunnel diode 2 is read.

It will first of all be assumed (FIG. *3a*) that the said diode is in the nonconducting state, called the "zero state," which is symbolically represented by the points 30, 30′, 30″ on the characteristic curves *3a*, *3b* and *3c*.

There will be denoted by $-V_o$ the voltage between the terminals of the diode when it is in this state, and by $i_o$ the current which then flows through it. Its state is characterized by the values $-V_o$ and $i_o$, and it is this state which must be "read." For this purpose, a pulse called the "reading pulse" of positive voltage $U_L$, is applied to the base of the transistor 7; this pulse is transmitted to the anode of the diode 2, which tends to result in an increase of $(U_L/R)$ of the current flowing through this diode, the dynamic resistance of which is negligible as compared with the value R of the resistance; consequently, the potential of the cathode of the diode 2 tends to increase the voltage $U_L$. However, such an increase is greater than that which is necessary for biasing the assembly comprising the unitunnel diode 1 and the auxiliary diode 5 in the forward direction for the diode 5. This assembly is therefore rendered conductive (positive region of the characteristic curve *3b*) and derives the current passing through the tunnel diode 2, because the apparent resistance of this assembly is low as compared with R. Since the dynamic resistance of the tunnel diode 2 is even lower, the valve $I_L$ of the current then flowing through the diode 2 and the assembly of diodes 1 and 5 is defined by the natural characteristic of the assembly. This natural characteristic is so chosen that reading does not destroy the stored information, since the reading current is at most equal to the peak current of the tunnel diode 5 for values of $U_L$ lower than the voltage $V_{FP}$ of the characteristic of the assembly formed of the diodes 1 and 5, and this peak current is lower than that which would be necessary to cause a change of state of the diode 2. This current limitation does not introduce any delay in the reading, since the tunnel diode 5 is only used in its threshold function and not for a transmission function. It is the passage of this current $I_L$ through the diode 5 when the reading pulse is applied that indicates the "zero" state of the tunnel diode 2.

Of course, the amplitude of the pulse $U_L$ is insufficient to cause a change of state of the tunnel diode 2.

The tunnel diode 2 will now be considered in the conductive state, called the "state 1," which corresponds to the points 31, 31′ and 31″ on the diagrams *3a*, *3b* and *3c*.

This state is characterized by a value of the current $i_l$ which is only slightly different from the value $i_o$ relative to the zero state, and a value $-V_1$ of the voltage. The same reading pulse $U_L$ applied at $B_2$ to the base of the transistor 7 and transmitted at L to the anode of the diode 2 has the effect of increasing the current through the diode 2 by the quantity $U_L/R$, and of bringing the potential of the cathode to a value increased by $U_L$. In contrast to the preceding case, in which the assembly of diodes 1 and 5 was in the rest state, so that the voltage between the terminals of the said assembly was substantially zero (FIG. *3b*, point 30′), the assembly is then initially biased by a voltage substantially equal to $-V_1$, further into the nonconductive region of its characteristic curve (FIG. *3b*, point 31). This is why, $V_1$ being higher than $U_L$, the application of the positive pulse $U_L$ does not render conductive the assembly of the two diodes 1 and 5.

It is the absence of current in the assembly of diodes 1+5 on the application of the reading pulse that then indicates that the diode 2 is in the state "1."

It should be noted that the only condition which must be met by the auxiliary diode 5 in order that it may be able to perform its function is that its peak current should be constant. This current may be, for example, made equal to 1 milliampere, so that the diode performs its current threshold function regardless of the ratio of the peak and valley currents.

It will now be explained how the apparatus according to the invention is employed to store an item of information or a write-in.

If it is desired to write-in the state 1, related to the presence of an item of information, this write-in must be effected at the tunnel diode 2. If, on the one hand, there is applied to the base of the transistor 6 a negative pulse of amplitude $U_{ec}$ which is transmitted to the cathode of the diode 5 and to the diode 1, and on the other hand there is applied to the base of the transistor 7 a positive pulse of amplitude $U_L$ which is transmitted to the anode of the diode 2, and if there is coincidence between these two pulses, the current through the tunnel diode 2 increases by a value $i_{ec}$, fixed by the current-voltage characteristic of the assembly 1+5 for the voltage $U_L+U_{ec}$. This current, added to the rest current, will cause the diode 2 to change over to a conductive state beyond the peak current, in the second positive region of its characteristic curve (FIG. *3c*, point 32). When the two pulses cease, the diode 2 returns to the stable state 1 (FIG. *3c*, point 31″).

It will now be explained how the apparatus according to the invention is employed to erase stored information, i.e. to bring the diode 2 to the state 0, or to confirm it in this state if it is already therein.

For this purpose, it will be sufficient to reduce sufficiently the current flowing through the diode, which may be effected by increasing the potential of its cathode. To this end, the anode of the diode 3 is temporarily brought to a positive potential by applying to the transistor 8 at $B_3$ a pulse of positive amplitude $U_F$, called the erasure pulse, which is transmitted to the point F.

In accordance with the invention, the tunnel-diode "memory point" whose operation has just been described may be constructed in the form of an integrated component.

FIGS. *5a* to *5c* illustrate schematically by way of example a section through an integrated component thus produced, in various stages of its manufacture.

The component comprises a substrate plate 51 (FIG. *5a*) of N-type monocrystalline silicon, the resistivity of which is, for example, 0.3 ohm-cm.

A protective oxide layer 52 is produced by a known method on the upper face of the plate 51, whereafter the layer is etched through a window of a first mask in order to free the zone 53 on the silicon surface. A P-type impurity is diffused into this zone in order to form therein a region 54 of P-type conductivity. In the course of this operation, oxidation occurs. The oxide layer 52 is then etched through a second mask in order to free a region 55, from the surface of which there is diffused an N-type impurity so as to form a layer 56 of N+-conductivity in the region 55 in the mass of the plate 51. In the course of this diffusing operation, a further oxidation occurs. A third selective etching is thereafter effected through a mask in order to free, on the one hand, a number of circular zones such as 57, 58 and 59 (FIG. *5b*) of small diameter (generally between 10 and 100 microns) which are intended to form the locations of the diodes 1, 2 and 3, and on the other hand zones such as 60 and 61 which are intended to enable contacts to be made on the resistor 4 at 54, and a further zone such as 62 intended to make contact on the substrate.

An evaporation of aluminum-boron is then effected on the wafer thus obtained. This evaporation may be carried out, for example, by a known method.

A further etching is thereafter effected through a mask which permits preserving the aluminum-boron deposit only at predetermined locations, such as 63 and 64 for the diodes 1 and 3. The wafer is then introduced into a furnace and subjected to a thermal alloying treatment in a vacuum so as to form the junctions of the diodes 1 and 3. After this operation, a second layer of aluminum-boron is applied by evaporation under conditions similar to those of the first deposition. A further selective etching is then effected through an appropriate mask so as to form a contact 65 on the resistor 54 through the aperture 60, to establish the interconnection 66 between the resistor 54 and the N-type substrate through the apertures 61 and 62 (common point A), and finally to provide the contacts of the diodes 1 and 3 at 63 and 64. In addition, the mask preserves the aluminum-boron deposit which is necessary to form the diode 2 shown at 67.

The junction of the diode 2, designated by 67, may thereafter be made by a laser treatment, for example that described by the applicants in their French Pat. application No. PV 127,412, filed on Nov. 8 1967.

In order to increase the performances of the "memory point," it is desirable to reduce the parasitic capacitances of the diffused resistor 54. This may be advantageously done by employing a known method of insulation by encapsulation in accordance with the so-called E P I C technique.

In another method, the resistor 54 is produced, not by diffusion, but by cathode sputtering of tantalum upon a homogeneous silicon oxide layer.

In accordance with another method, the three diodes 1, 2 and 3 may be produced by a laser treatment.

While the invention has been particularly shown and described with reference to preferred embodiments thereof, it will be understood by those skilled in the art that various changes in form and details may be made therein without departing from the spirit and scope of the invention.

What we claim is:

1. In a memory-points matrix for a reading-writing device constructed in the form of an integrated circuit which permits nondestructive readout of the information stored therein, each memory point comprising: a memory tunnel diode in series with a load resistor for bringing said series into two stable states in the presence of a normal supply voltage, two additional diodes connected to the common terminal of said memory diode and said resistor, one of said additional diodes being a unitunnel diode the other of said additional diodes being an ordinary diode, the other two terminals of said additional diodes being connected to erasing and writing control means, said common terminal constituting the cathode terminal of said three diodes, and having the form of a substrate of N-type silicon, the junctions of said memory diode and of said unitunnel diode being formed by alloying in a zone of said substrate in which the active impurity of concentration has been strengthened in order to make it N+-type, and the junction of said ordinary diode being formed in a zone of said substrate in which the concentration is not reinforced.

2. The memory-point matrix according to claim 1, wherein the material for producing at least one of said diodes is an aluminum-boron alloy.

3. The memory-point matrix according to claim 1, wherein said resistor consists of a zone of said substrate which has been made P-type by a diffusion of active impurities.